United States Patent [19]

Hamilton

[11] 4,238,104
[45] Dec. 9, 1980

[54] ENERGY ABSORBING MOTOR MOUNT ASSEMBLY

[76] Inventor: Rex Hamilton, 944 South Ct., Visalia, Calif. 93277

[21] Appl. No.: 933,643

[22] Filed: Aug. 14, 1978

[51] Int. Cl.³ .............................................. F16M 13/00
[52] U.S. Cl. .................... 248/566; 248/569; 248/636; 248/638
[58] Field of Search ............... 248/562, 565, 566, 569, 248/576, 578, 621, 636, 638; 188/1 B

[56] References Cited

U.S. PATENT DOCUMENTS

| | | | |
|---|---|---|---|
| 2,312,718 | 3/1943 | Kouyoumjian | 248/638 X |
| 2,501,060 | 3/1950 | Liebing | 188/1 B X |
| 2,852,223 | 9/1958 | Roberts | 248/566 |
| 2,960,189 | 11/1960 | Osburn | 188/1 B |
| 3,718,304 | 2/1973 | Schulz et al. | 180/64 R X |
| 3,815,703 | 6/1974 | De Lorean et al. | 180/91 |
| 3,851,722 | 12/1974 | Grosseau | 180/82 R |
| 3,869,017 | 3/1975 | Feustel | 180/82 R X |
| 3,895,694 | 7/1975 | Muntjanoff | 188/1 B X |

FOREIGN PATENT DOCUMENTS 527895 10/1940 United Kingdom ..................... 248/569

*Primary Examiner*—William H. Schultz
*Attorney, Agent, or Firm*—Warren, Chickering & Grunewald

[57] ABSTRACT

An energy absorbing motor mount assembly is disclosed in which a mounting element, including an arm having an enlarged head portion, is mounted for reciprocation in fore and aft directions inside a containment housing. Resiliently displaceable energy absorbing means are positioned on either side of the head portion to resist displacement in either the fore or aft direction. The head is dimensioned to prevent removal from the containment housing and is surrounded by a rubber-like member, which resiliently resists displacement in combination with compression springs. The rubber member also resists displacement in directions transversed to the permitted fore and aft displacment. The resilient spring force applied to the head of the mounting element can be adjusted to vary the energy absorption characteristics of the motor mount assembly.

5 Claims, 8 Drawing Figures

ENERGY ABSORBING MOTOR MOUNT ASSEMBLY

BACKGROUND OF THE INVENTION

The use of energy absorbing motor mount assemblies to attempt to insulate or reduce the transmission of vibrations from the engine of the vehicle to the frame and passengers is widespread. Conventionally a vehicle engine will be supported from the frame by three or four motor mount assemblies which include, as a part thereof, a rubber block or washer that reduces vibration and shock loads.

In recent years a second function of engine motor mounts has become quite important. In addition to damping vibration, shock loads and engine roll, the engine motor mount assemblies can also act as a significant factor in enhancing the safety of a vehicle during collision conditions. When a motor vehicle impacts a relatively immovable object, at even moderate speeds, it is not uncommon for the engine to be driven rearwardly through the fire wall of the vehicle and into the passenger compartment. This often occurs as a result of the engine motor mount assemblies being unable to absorb the impact energy.

Some attempts have been made to provide engine motor mounts which are capable of absorbing energy during the shock loading of a collision. Typical of these prior efforts are the apparatus disclosed in U.S. Pat. Nos. 3,869,017, 3,851,722, 3,815,703 and 3,718,304. In the first of these U.S. Pat. No. 3,869,017, a system is disclosed in which the vehicle frame is formed to provide an energy absorbing capability and the motor mounts for the engine are break-away mounts formed to fracture and enable the engine to separate from the frame. While this approach may be desirable for certain types of collisions, particularly when the frame or the body of the vehicle is stopped but the engine is not, it has certain drawbacks. If the engine is stopped by the impact of collision before the frame is, the engine will be sheared away from the frame while the car body continues forwardly with the result that the fire wall may be driven over the engine. A similar approach is employed in U.S. Pat. No. 3,851,722.

The system of U.S. Pat. No. 3,815,703 is also similar in that the engine is rigidly secured to impact bars so that it will be immediately stopped upon a collision. The energy absorbing capability of the system is provided between the impact bars and the frame and in the frame itself. Once the engine is stopped, it is easier to decelerate the frame and its lowered moment of inertia. There is always the possibility, however, that the frame will not be decelerated to zero velocity before the passenger compartment of the vehicle is driven over the engine.

In U.S. Pat. No. 3,718,304 an engine motor mount assembly is disclosed in which rubber blocks are employed as an energy absorbing means in combination with shear pins which are designed to shear upon impact of the vehicle with an immovable object. Under a high energy impact in which the shear pins are severed, the rubber block is also loaded in shear, as it absorbs energy. This approach, however, is dependent in no small part upon the strength of the rubber block in shear and its bonding to the respective movable parts. This assembly does not provide a positive limit on the movement of the mounting brackets once the shear pins have been severed.

OBJECTS AND SUMMARY OF THE INVENTION

A. Objects

Accordingly, it is an object of the present invention to provide an engine or motor mount assembly for a vehicle which is capable of absorbing a high energy impact without resulting in relative displacement of the engine into the passenger compartment of the vehicle.

Another object of the present invention is to provide an engine motor mount assembly which is highly effective in absorbing vibration, roll and other normal relative displacements between the engine and the frame while still providing enhanced safety during collision conditions.

It is still a further object of the present invention to provide an energy absorbing engine motor mount assembly which can be easily and inexpensively manufactured and installed as original or replacement equipment.

Still a further object of the present invention is to provide an energy absorbing motor mount assembly which can be adjusted to vary the energy absorption performance in accordance with the vehicle and projected vehicle operating conditions.

Still a further object of the present invention is to provide an energy absorbing motor mount assembly which is durable, has a minimum of removable parts, and is fatigue resistance.

The energy absorbing motor mount assembly has other objects and features of advantage which are set forth in more detail in or will become apparent from the following description of the preferred embodiments and the accompanying drawing.

B. Brief Summary of Invention

The energy absorbing motor mount of the present invention includes a pair of mounting elements with a resiliently displaceable energy absorbing means mounted there between. In the improved form of the motor mount assembly, one of the mounting elements is formed with a containment portion and the remainder of the mounting elements is formed with an arm extending into the containment portion and preferably terminating in an enlarged head portion. The arm and containment portion are cooperatively formed to positively prevent withdrawal of the arm from the containment portion, and the energy absorbing means is positioned on both the fore and aft facing sides of the arm so that relative displacement of the arm in fore or aft directions is resisted initially by the energy absorbing means and is eventually limited positively by the containment housing. Preferably the energy absorbing means includes a rubber block which is mounted to the enlarged head of the arm and engages pressure plates on the fore and aft sides thereof, which pressure plates in turn bear upon compression springs. Adjustment means are provided so that the initial force in the compression springs can be selectively varied in accordance with vehicle parameters and projected operating conditions.

DESCRIPTION OF THE PREFERRED EMBODIMENTS

Figure 1:
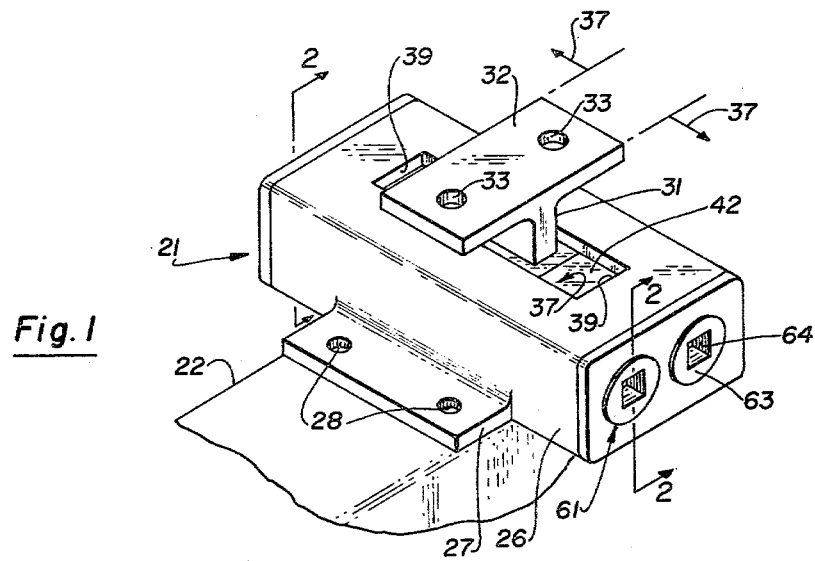
FIG. 1 is a fragmentary, top perspective view of an energy absorbing motor mount assembly constructed in accordance with the present invention.
Figure 2:
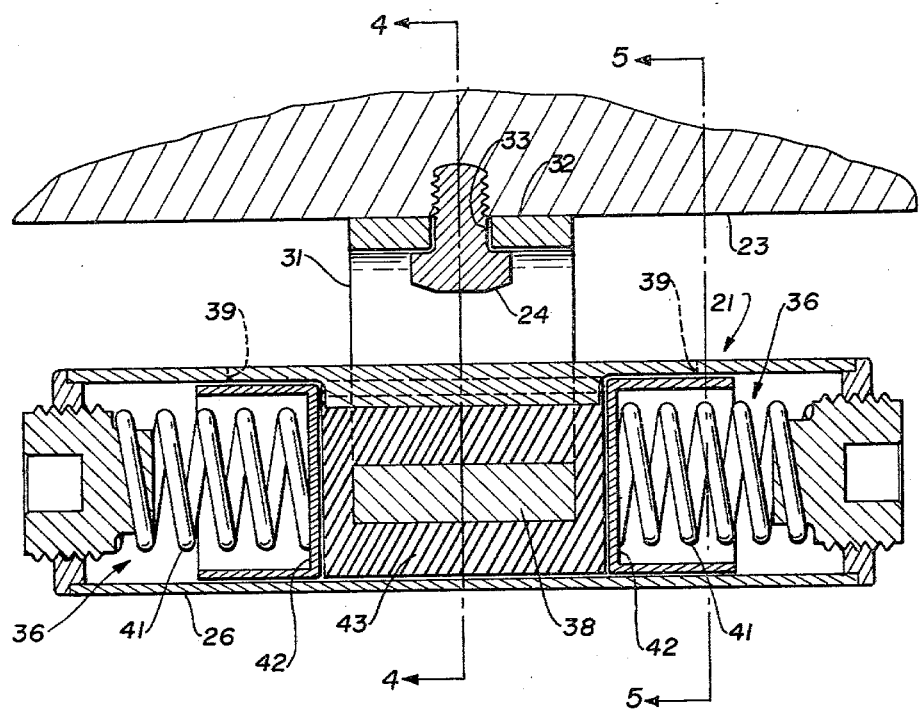
FIG. 2 is an enlarged, cross-sectional view taken substantially along the plane 2—2 in FIG. 1.

The energy absorbing motor mount assembly of the present invention can be employed at any location at which a conventional motor mount would be installed. Typically, in most passenger vehicles four engine motor mounts are used to support the motor from the frame, although in some vehicles only three mounts are employed. Moreover, the expression "motor mount" shall be deemed to include mounts of the type used to support the transmission from the frame, as well as mounting assemblies which are used solely to support the engine.

In FIGS. 1 through 5, the energy absorbing motor mount, generally designated 21, can be seen to be mounted to a vehicle frame member 22 and to a vehicle motor or engine 23 by plurality of fasteners, usually bolts 24. The motor mount assembly includes a first mounting element 26, in this case formed with laterally extending flanges 27 having openings 28 therein to receive bolts 24 for mounting the assembly to frame 22. A second mounting element 31 is further provided and includes a transversely extending flange portion 32 formed with openings 33 for receipt of fasteners 24 in order to enable mounting of the second mounting element to motor 23.

In order to provide an energy absorbing capability, the motor mount assembly further includes resiliently displaceable means, generally designated 36 (FIGS. 2 and 3), mounted intermediate the first and second mounting elements. First mounting element 26 and second mounting element 31 are formed to permit relative movement there between in fore and aft directions along the vehicle, as indicated by arrows 37 in FIG. 1. Additionally, the mounting elements are formed for cooperative engagement and displacement of energy absorbing means 36 upon relative movement of the mounting elements.

As thus far described, the energy absorbing motor mount assembly includes components found in other engine motor mounts, namely, mounting elements or brackets and an energy absorbing component disposed between the mounting elements. In the improved mounting assembly of the present invention, however, the assembly provides for substantial energy absorption in both the fore and aft directions as well as positive coupling of the engine to the frame, which combination substantially enhances passenger safety under collision conditions. Moreover, the improved energy absorbing mounting assembly provides enhanced isolation of the engine from the frame under normal operating conditions.

As can be seen in FIGS. 1 through 5, one of mounting elements 26 and 31 is formed to include a containment portion and the remainder of the mounting elements is formed to include an arm portion. Although it is possible to reverse the parts, it is preferable that first mounting element 26 be formed to include a containment housing from which mounting flanges 27 extend. Containment housing 26 may be further formed with an elongated slot or opening 37, through which second mounting element including an arm portion 31 extends. Arm portion 31 further preferably terminates in an enlarged head portion 38, and it will be particularly apparent from FIG. 4 that head portion 38 is of the size which will positively prevent withdrawal of arm 31 from containment housing 26. Ends 39 of the slot form an abutment which limits the fore and aft movement of arm 31, while the sides of the slot limit the lateral movement and the enlarged head prevents withdrawal of the arm from the containment housing.

In order to provide a substantial energy absorbing capability in both the fore and aft directions, energy absorbing means 36 is preferably formed as a pair of oppositely facing biasing assemblies. As shown in FIGS. 1 through 5, these biasing assemblies include spring elements 41 which bear upon cup-shaped pressure plates 42 that in turn engage a rubber-like member 43 mounted on head 38. Each of these spring biasing assemblies urges the arm 31 to a neutral position, shown in FIGS. 1 and 2 as being generally mid-way between end walls 39 of slot 37. Relative displacement of containment housing 26 and arm 31 in either a fore or an aft direction will immediately be resisted by a combination of resilient displacement of rubber block member 43 and compression spring 41.

Figure 3:
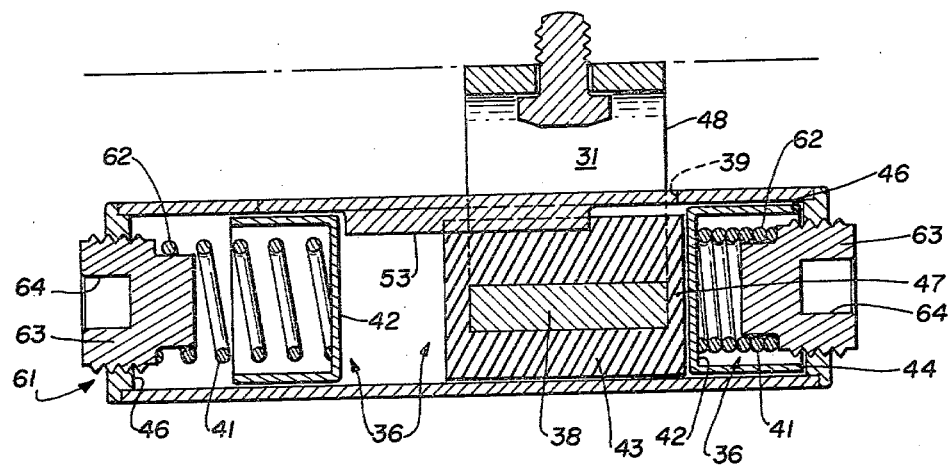
FIG. 3 is an enlarged cross-sectional view corresponding to FIG. 2, with components shown in a moved position.

As best may be seen in FIG. 3, relative displacement of the mounting elements will continue until spring 41 is fully compressed, at which point the end 44 of the cup 42 will seat against the end wall 46 of containment housing 26. Moreover, portion 47 of the rubber member 43, between the arm and the pressure plate cut 42, will further compress until the front edge 48 of the arm reaches end 39 of slot 37. It should be noted that the use of a cup-shaped pressure plate has the advantage of containing spring 41 during compression and further the length of the cup can be selected so as to prevent over compression or fatiguing of the spring 41 by seating of the end 44 of the cup against end wall 46 prior to permanent distortion of the spring. Additionally, the length of the slot 37 is selected so that the edge 48 will not impact the containment housing until after a predetermined amount of compression of the rubber block against pressure plate 42.

Once the full energy absorbing capability of spring 41 and rubber block 43 have been used to attempt to decelerate the relative movement of the engine and frame, the mounting elements positively engage each other to limit or prevent separation of the engine from the frame. While it is possible under extremely high energy impact to sever mounting blots, destroy the arms or containment housing, or even sever the frame, the mounting elements of the mounting assembly of the present invention can be formed of materials of sufficient strength and thickness so as to withstand most high energy collision situations without pulling apart.

Thus, the energy absorbing motor mount of the present invention enables the absorption of a high energy impact through a combination rubber block—compression spring assembly, and the engine mount further acts as a positive restraint against separation of the mounting elements during impact. It is important that this function is provided in both the fore and aft directions since in many collisions the frame is initially stopped or slowed down followed by complete stopping of the engine, followed by complete stopping of the frame. Thus, the motion during a high energy impact or collision can be first a forward motion of the engine followed by a rearward motion, and the provision of resiliently displaceable energy absorbing means on both the fore and aft facing sides of arm 31 affords a construction which will enable a maximum absorption of energy for maximum deceleration during the dynamics of collision.

It should be noted that in addition to mounting the pressure plate cups 42 for slidable movement in housing 26, rubber block member 43 is slidably mounted in housing 26. This is preferable to attempting to permanently bond the rubber-like member 43 to the housing, since it insures a purely axial compression of the rubber block against pressure plate 42, rather than shear loading of the rubber block. Shear loading would induce a moment in arm 31 tending to tilt the respective positions of the frame and engine. The rubber block 43 can be cast in housing 26 between pressure plates 42 from a natural or synthetic rubber of a durometer in the range conventionally used in motor mounts. There will be some tendency for such a cast member to bond to the housing, but this can be overcome or reduced to a sufficiently low level by the use of release agents.

Figure 4:
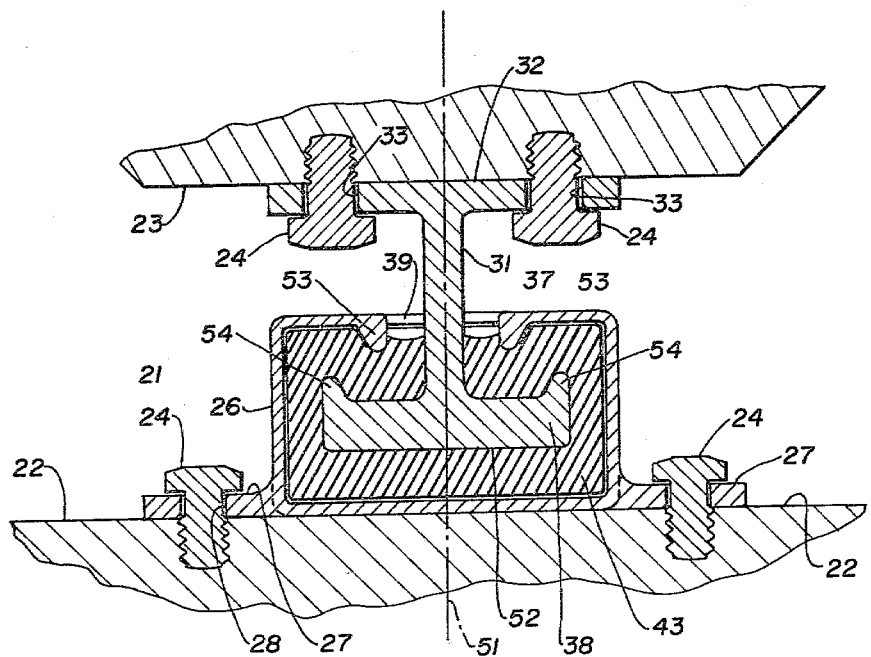
FIG. 4 is an end view, in cross-section, taken substantially along the plane of line 4—4 in FIG. 2.

As best may be seen in FIG. 4, the energy absorbing motor mount assembly of the present invention affords substantial energy absorbing capability in connection with displacements in a direction transverse to the fore and aft directions along the vehicle. Thus, the rubber-like member 43 substantially surrounds the entire head 38 and mates with the interior of housing 26 so as to isolate the first mounting element from the second by a rubber block. The enlarged head 38 is advantageously formed to diverge from the central axis 51 of arm 31 a substantial distance and to extend longitudinally in housing 26 substantial distance so that the downwardly facing surface 52 which bares upon the rubber block 43 has sufficient area for support of the engine weight without unduly compressing or fatiguing the rubber block. Moreover, the lateral extension of head 38 and housing 26, with the rubber block in between, affords substantial resistance to roll and lateral displacement of the engine during operation. This resistance to roll is further enhanced by providing downwardly depending flanges 53 on the housing 26 and upwardly extending flange portions 54 on head 38. Additionally, the flanges 53 and 54 tend to interlock and further resist withdrawal of the arm from the containment housing.

Figure 5:
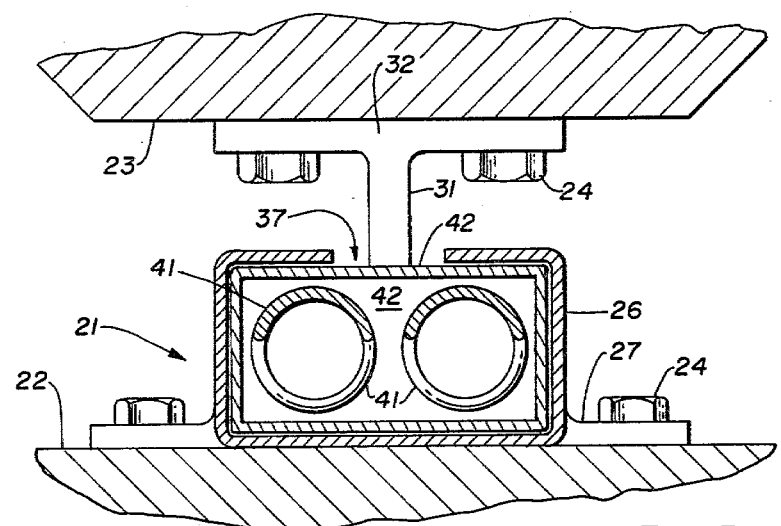
FIG. 5 is an end view, in cross-section taken substantially along the plane of line 5—5 in FIG. 2.

In order to enable an adjustment of the energy absorbing motor mount assembly of the present invention to accommodate different engine weights and projected performance characteristics, it is a further feature of the present invention to provide biasing force adjustment means, generally designated 61, operatively connected to the energy absorbing means 36 and formed to enable adjustment of the biasing force applied to arm portion 31 upon displacement of the arm from the neutral position. One manner in which this can be accomplished is by mounting the ends 62 of springs 41 on an axially displaceable member 63, which is threadably received in housing end wall 46. The spring force applied by spring 41, therefore, can be adjusted by screwing the member 63 inwardly or outwardly to thereby preload the springs 41. As can be seen in FIGS. 1 and 5, it is preferable that the engine mounting assembly of the present invention include a pair of side-by-side springs on each of the fore and aft sides of the arm 31. Each of the springs may be provided with adjustment means 61, including a member 63, which can be engaged at recess 64 by a socket wrench or similar tool so as to enable independent adjustment of both the fore and aft sides of the motor mount assembly. It will be seen from FIG. 5 that both the springs of 41 are mounted in a common cup-like pressure plate, which tends to even out minor differences in the independent pre-loading of springs 41 on a given side of the arm.

Figure 6:
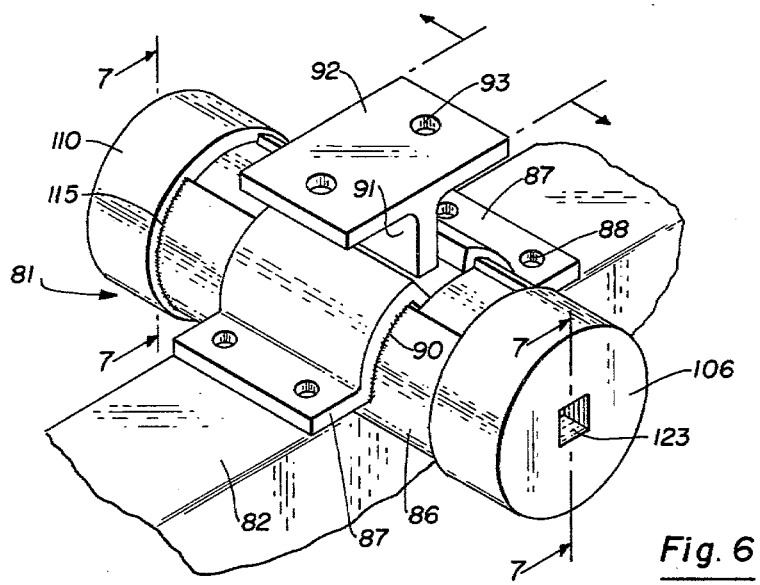
FIG. 6 is a top perspective view of an alternate embodiment of the energy absorbing motor mount assembly of the present invention.
Figure 7:
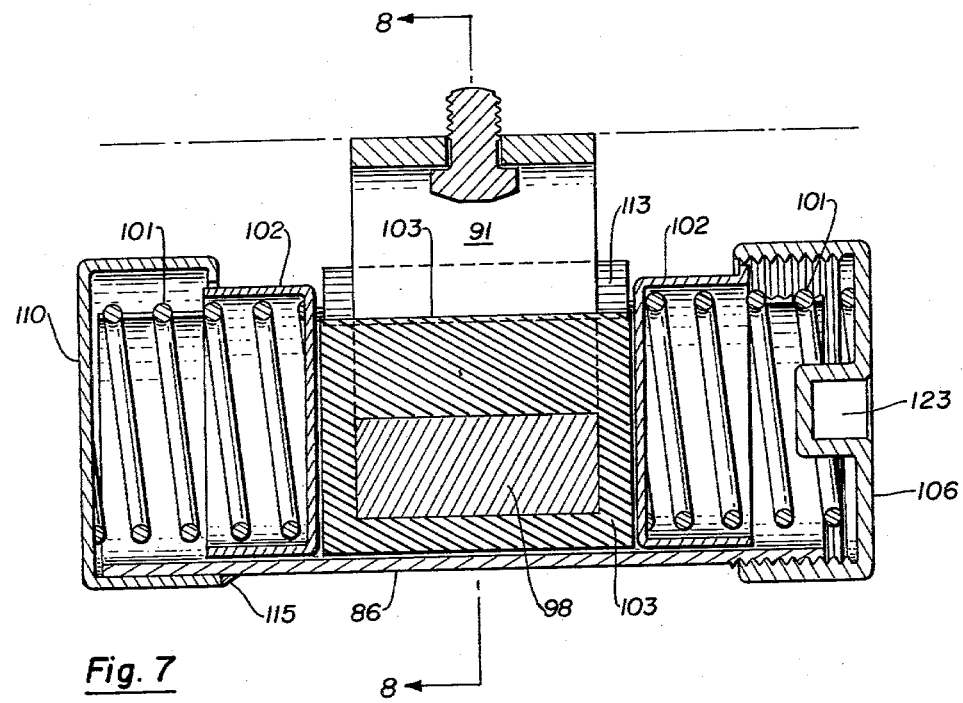
FIG. 7 is an enlarged, side-elevational view in cross-section, taken substantially along the plane of line 7—7 in FIG. 6.
Figure 8:
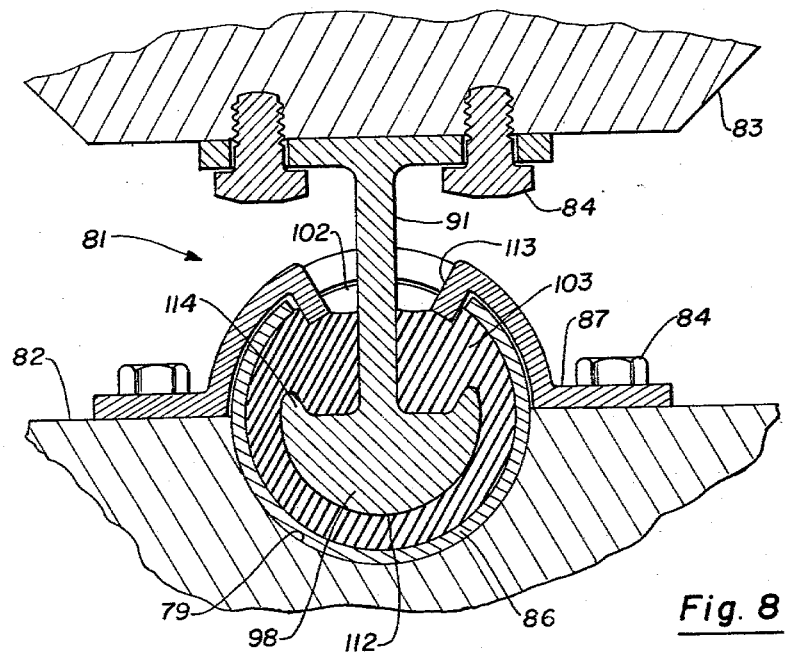
FIG. 8 is an end elevational view, in cross-section, taken substantially along the plane of line 8—8 in FIG. 7.

In FIGS. 6 through 8, an alternative embodiment of the energy absorbing motor mount assembly is shown in which elongated housing portion 86 is generally cylindrical in shape and has secured thereto (e.g., by welding at 90) a transversely extending flange 87 having openings 88 for the receipt of mounting bolts 84 to enable mounting of the assembly to frame 82. In the same manner as was described in connection with the embodiment of FIGS. 1–5, the energy absorbing motor mount of FIGS. 6–8 also includes an arm portion 91 which extends from a transverse plate or base 92 that can be bolted through openings 93 to the engine 83 by bolts 84. As best may be seen in FIG. 8, the cylindrical shape of containment housing 86 and the shape of mounting brackets or flanges 87 requires the presence of a recess 79 in frame member 82. As will be understood, brackets 87 could be formed in a manner which would enable mounting of assembly 81 on top of frame member 82 so as to eliminate the need for frame recess 79.

The resiliently displaceable energy absorbing means of assembly 86 is again preferably provided by a pair of opposed compression springs 101, which bear against a cup-shaped pressure plate 102, that in turn engages a rubber-like member or block 103 mounted on an enlarged head 98 on arm 91. Thus, the combination of a compression spring and resiliently displaceable mass is again used on both the fore and aft sides of arm 91 to absorb energy. The rubber block 103 can be seen from FIG. 8 to substantially mate with the housing and it is formed for sliding reciprocation in the housing rather than being bonded to the same. As will also be seen from FIG. 8, head portion 98 has a configuration which corresponds to the containment housing 86 and yet extends laterally from arm 91 a sufficient distance to present a lower surface 112 of substantial area for support of the engine weight. Additionally, the flanges 113 on mounting bracket 87 and the flanges 114 on head 98 cooperatively load the rubber block 103 so as to resist roll about the longitudinal access of the assembly.

In the form of the energy absorbing motor mount assembly of FIGS. 6–8, adjustment of the spring biasing force applied to arm 91 is accomplished at only one end of the assembly. Thus end cap member 110 is rigidly secured to housing 86, such as by welding at 115, while end cap member 106 is threadably mounted on the end of housing 86 for axially displacement along the housing. A socket fitting or recess 123 may be formed in the end of cap 106 to permit axial adjustment of the spring force applied to the arm. When adjustment is achieved at a single end of the housing, the result of adjustment will be to bias the arm to a neutral position somewhat displaced toward or away from the immovable cap 110, depending upon the direction of adjustment.

In both embodiments of the energy absorbing motor mount of the present invention a high, adjustable, energy absorbing capability for collision conditions is provided which will be operative in decelerating relative movement in both the fore and aft directions and yet will provide a positive high strength coupling between the engine and frame of the vehicle.

What is claimed is:

1. An energy absorbing motor mount assembly including a first mounting element formed for mounting to a frame of a vehicle, a second mounting element formed for mounting to a motor for said vehicle, one of said mounting elements being formed to include a containment portion and a remainder of said mounting elements being formed to include an arm portion, said arm portion being mounted to extend into said containment portion, and said arm portion and said containment portion being further cooperatively formed to positively prevent withdrawal of said arm portion from said containment portion, and resiliently displaceable energy absorbing means mounted intermediate the mounting elements, said mounting elements and said energy absorbing means being formed for cooperative engagement and displacement of said energy absorbing means upon relative movement of said mounting elements in directions having vertical components to provide vibrational damping of motor operation, wherein the improvement in said motor mount assembly is comprised of:

said energy absorbing means including spring means positioned on both fore and aft facing sides of said arm portion, said spring means being horizontally oriented and formed with an energy absorbing capacity in a horizontal direction which is substantially greater than the energy absorbing capacity of said energy absorbing means in a vertical direction to resiliently bias said arm portion to a neutral position from which horizontal displacement of said arm portion in fore and aft directions as a result of relative movement between said motor and said frame during a high energy vehicle impact is resisted initially by said spring means and is eventually positively limited by said containment portion.

2. An energy absorbing motor mount assembly as defined in claim 1 wherein, said spring means is provided by a pair of compression springs mounted on said fore and aft sides of said arm portion, and a rubber-like member is interposed between said compression springs and said arm portion.

3. An energy absorbing motor mount assembly as defined in claim 2 wherein, said containment portion is formed as a housing elongated in said fore and aft directions and having an elongated slot therein, said arm portion extends through said slot and terminates in an enlarged head portion dimensioned to prevent removal from said housing through said slot said rubber-like member is mounted to said arm portion for movement therewith and slidably engages said housing for movement therealong.

4. An energy absorbing motor mount assembly as defined in claim 3, and pressure plate means interposed between each of said compression springs and said rubber-like member.

5. An energy absorbing motor mount assembly as defined in claim 4 wherein said pressure plate means are provided as cup-like members slidably mounted in said housing and facing away from said arm portion, and each said compression springs each have an end thereof positioned inside said cup-like members, and said cup-like members have a length greater than the length of said compression springs in a fully compressed condition to prevent spring fatigue.

* * * * *